(12) United States Patent
Takahira et al.

(10) Patent No.: US 8,954,856 B2
(45) Date of Patent: Feb. 10, 2015

(54) APPARATUS AND METHOD FOR GENERATING SLIDE SHOW AND PROGRAM THEREFOR

(75) Inventors: Masayuki Takahira, Kanagawa-ken (JP); Hajime Shirasaka, Kanagawa-ken (JP)

(73) Assignee: Facebook, Inc., Menlo Park, CA (US)

( * ) Notice: Subject to any disclaimer, the term of this patent is extended or adjusted under 35 U.S.C. 154(b) by 1050 days.

(21) Appl. No.: 12/850,859

(22) Filed: Aug. 5, 2010

(65) Prior Publication Data

US 2010/0325548 A1  Dec. 23, 2010

Related U.S. Application Data

(62) Division of application No. 11/360,616, filed on Feb. 24, 2006, now Pat. No. 7,805,679.

(30) Foreign Application Priority Data

Feb. 24, 2005 (JP) .................................. 2005-048461
Feb. 24, 2005 (JP) .................................. 2005-048462

(51) Int. Cl.
| | | |
|---|---|---|
| G06F 3/00 | (2006.01) | |
| G06F 17/30 | (2006.01) | |
| G11B 27/034 | (2006.01) | |
| G11B 27/036 | (2006.01) | |
| G11B 27/10 | (2006.01) | |

(52) U.S. Cl.
CPC ........ *G06F 17/30274* (2013.01); *G11B 27/034* (2013.01); *G11B 27/036* (2013.01); *G11B 27/105* (2013.01); *G11B 2220/218* (2013.01); *G11B 2220/2562* (2013.01)
USPC ....................................... 715/730

(58) Field of Classification Search
None
See application file for complete search history.

(56) References Cited

U.S. PATENT DOCUMENTS

| | | | |
|---|---|---|---|
| 7,580,952 B2* | 8/2009 | Logan et al. ........................ 1/1 |
| 8,201,073 B2* | 6/2012 | Canora et al. .................. 715/201 |
| 8,473,511 B2* | 6/2013 | Arrouye et al. ................ 707/775 |
| 2002/0140843 A1* | 10/2002 | Tretter et al. .................. 348/362 |
| 2002/0147661 A1* | 10/2002 | Hatakama et al. .............. 705/26 |
| 2003/0085913 A1* | 5/2003 | Ahmad et al. ................. 345/730 |
| 2003/0103149 A1* | 6/2003 | Kinjo et al. ................ 348/231.5 |
| 2003/0151767 A1 | 8/2003 | Habuta et al. |
| 2004/0027369 A1* | 2/2004 | Kellock et al. ................ 345/716 |
| 2004/0095379 A1* | 5/2004 | Chang et al. .................. 345/727 |

(Continued)

FOREIGN PATENT DOCUMENTS

| | | |
|---|---|---|
| JP | 10-150538 A | 6/1998 |
| JP | 10-150541 A | 6/1998 |
| JP | 11-154218 A | 6/1999 |

*Primary Examiner* — Matt Kim
*Assistant Examiner* — Maryam Ipakchi
(74) *Attorney, Agent, or Firm* — Sheppard Mullin Richter & Hampton LLP

(57) ABSTRACT

When slide show image data sets are generated from a plurality of image data sets, the image data sets, DVD-Video files representing the slide shows generated from the image data sets, and information representing reproduction order are stored in a manner that allows a user to access them so that pleasure of the slide shows for the user is not ruined. The user changes the images to be included in the DVD-Video files and the reproduction order, while referring to the image data sets, the DVD-Video files, and the information. A digitalization center newly generates DVD-Video files according to the changed images and the changed reproduction order.

20 Claims, 11 Drawing Sheets

(56) References Cited

U.S. PATENT DOCUMENTS

2004/0122539 A1* 6/2004 Ainsworth .................. 700/94
2004/0125148 A1* 7/2004 Pea et al. ................... 345/802
2004/0150724 A1 8/2004 Nozaki et al.
2005/0158037 A1* 7/2005 Okabayashi et al. ........... 386/96
2006/0133795 A1 6/2006 Terai

* cited by examiner

FIG.9

| | | |
|---|---|---|
| 1970 | TITLE A | — L0 |
| | TITLE B | |
| | TITLE C | |
| | TITLE D | |
| 1981 | TITLE E | |
| | TITLE F | |
| | TITLE G | |
| 1991 | TITLE H | |
| | TITLE I | |
| | TITLE J | |

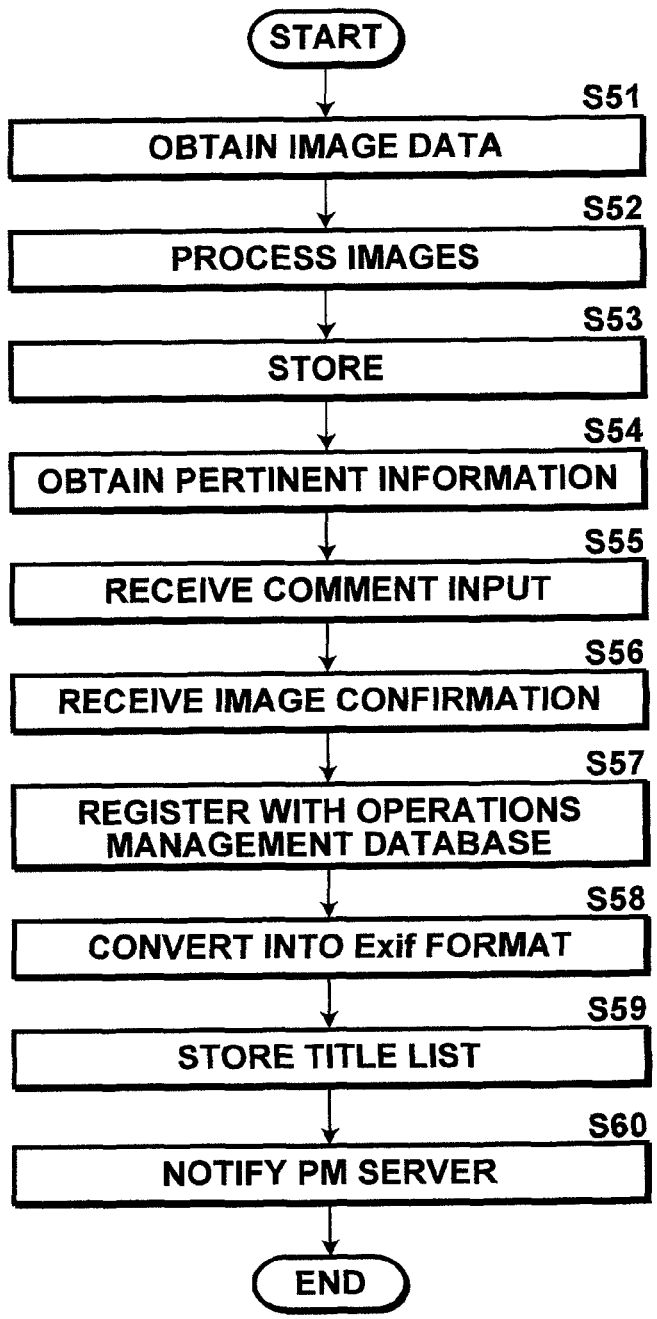

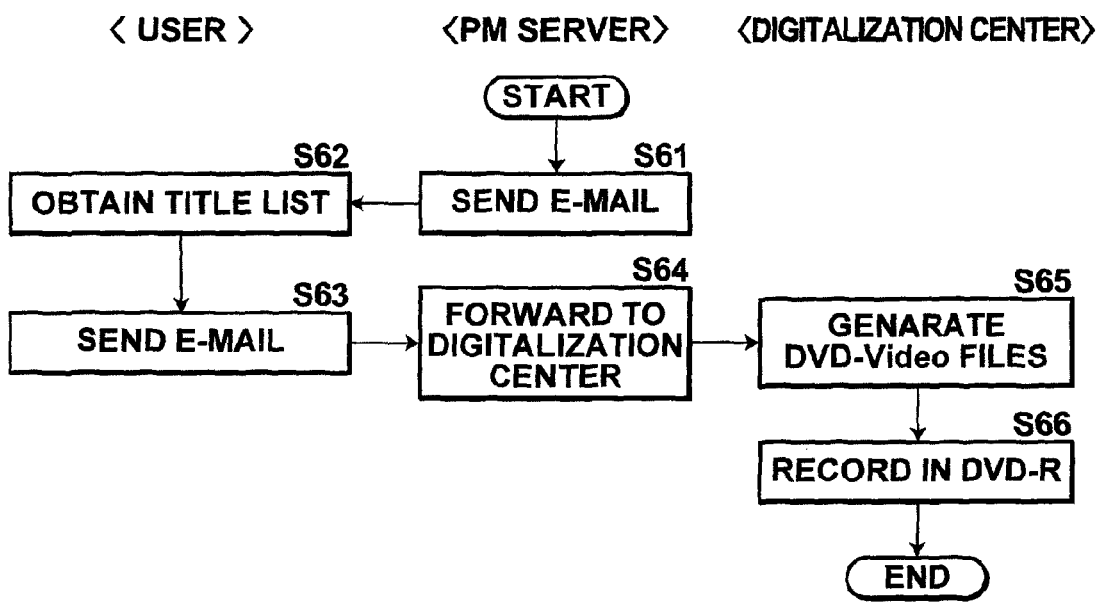

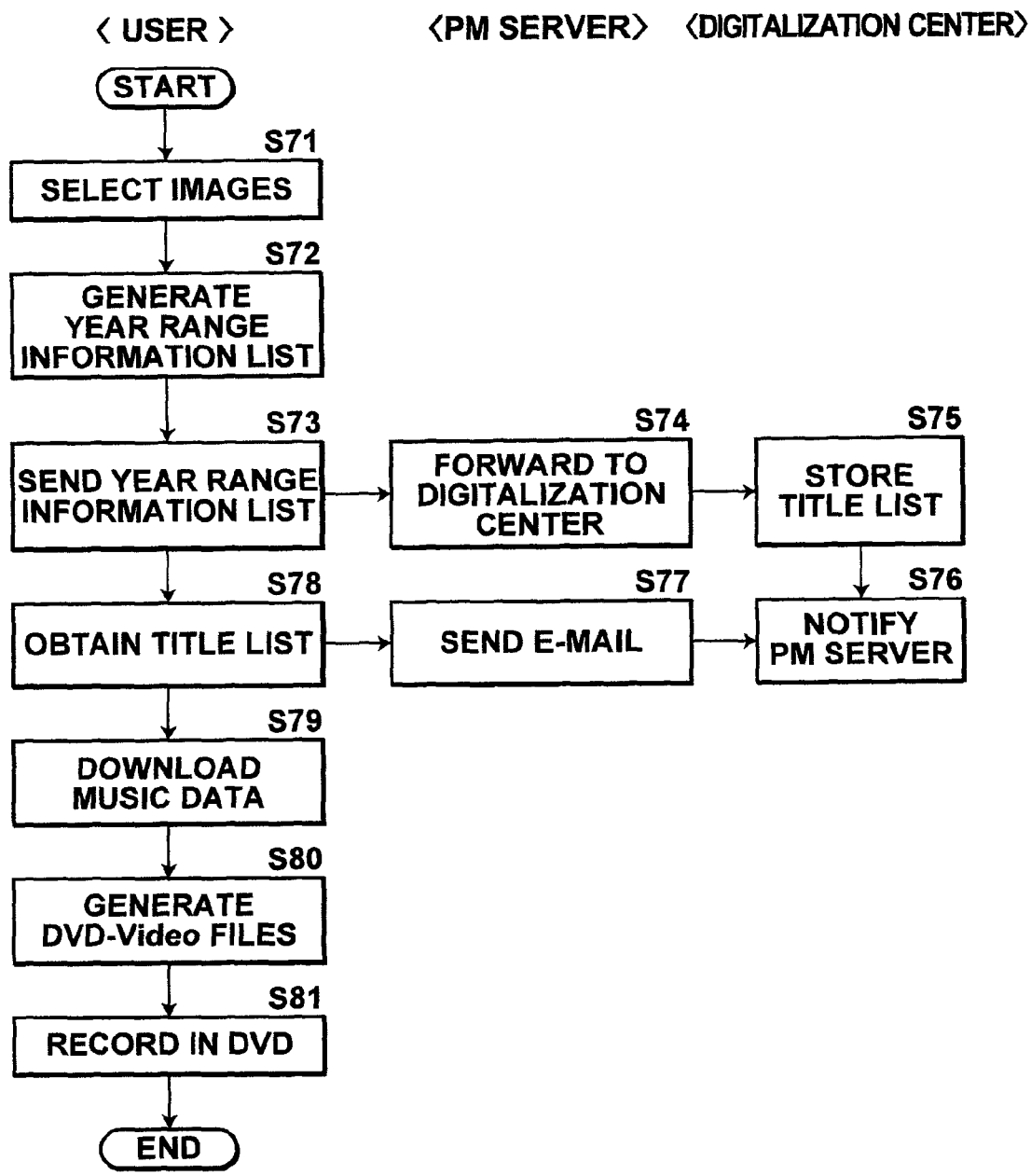

APPARATUS AND METHOD FOR GENERATING SLIDE SHOW AND PROGRAM THEREFOR

This application is a divisional of U.S. application Ser. No. 11/360,616, filed Feb. 24, 2006, which claims priority from JP 2005-048461, filed Feb. 24, 2005, and JP 2005-048462, also filed Feb. 24, 2005, each of which is incorporated herein by reference in its entirety.

BACKGROUND OF THE INVENTION

1. Field of the Invention

The present invention relates to an apparatus and a method for generating a slide show image from images that are changed serially in the slide show image and a program for causing a computer to execute the method.

2. Description of the Related Art

Prints generated from conventional silver-salt photographic films have been used in various manners. For example, such prints and films are used for checking how images look, for communicating with friends by showing the prints, for sending additional prints to friends, for display of enlargements thereof, and for generating photo albums. However, prints generated from silver-salt photographic films only accumulate if the prints are not set in order. Therefore, using the prints and the films, such as finding a desired one of the prints and generating an additional print, becomes difficult. Especially, in the case where the number of prints becomes large, the prints tend to be left without consideration of photography order, which makes setting the prints in order more difficult.

Prints can be used easily if frequently arranged in order. However, classification of prints according to time and date of photography or theme is troublesome. Even if prints are set in order in the form of a photo album, no copy of the photo album is usually made. Therefore, enjoying photographs therein is difficult for a large number of people or for a person living in a remote place.

If classification of prints is neglected, not only prints but also negative films accumulate. Negative films are in most cases left as they are or stored in bags or boxes without classification thereof. If a user as a photographer ages and the number of family members increases, the number of prints and negative films also increases more and more. Therefore, a large amount of prints and negative films are neglected if no classification is carried out thereon. Prints and negative films are seldom discarded since no additional prints can be made if they are discarded. Consequently, many households are troubled by how to classify and store such prints and films.

Meanwhile, a photograph service system has been proposed in Japanese Unexamined Patent Publication Nos. 10(1998)-150538 or 10(1998)-150541, for example. In such a system, images recorded on a negative film or prints are read by a reading apparatus such as a scanner for obtaining image data sets. The image data sets are stored in a recording medium such as a CD-R and reproduced by a reproduction apparatus such as a personal computer for appreciation thereof. Furthermore, the image data sets are printed at the request of a user. In addition, a network photograph service system including an image storage system has also been proposed in Japanese Unexamined Patent Publication No. 11(1999)-154218, for example. In the network photograph service system, image data sets are sent to and stored in an image storage server via a network such as the Internet, and various kinds of processing regarding the image data sets, such as viewing the image data sets and placing a printing order, can be carried out with use of a terminal remote from the image storage server.

However, in the image storage system described above, images are read from a negative film at the same time as the images are printed after development of the film. Therefore, image data sets are stored collectively for each roll of film. Consequently, relating a user who requested storage of the image data sets to the film roll is a troublesome task. In addition, images are only read from a negative film and stored thereafter. Therefore, a large amount of image data sets are simply stored without being set in order if images are read from prints or negative films neglected in a household. In this case, a user who accesses the image storage server needs to set the image data sets in order, which is as troublesome as in the case of classification of the prints and the negative films. Therefore, such a system is not convenient.

For this reason, a so-called "photo mining" service system has been proposed in U.S. Patent Application Publication No. 20030151767. In this system, image data sets are obtained from recording media such as prints and negative films, and related to recording media information representing the recording media from which the image data sets have been obtained. The image data sets related to the recording media information are then stored for each user, based on user information. In this system, if a user only requests image readout from a DPE store although a large amount of prints and negative films neglected in his/her household have not been set in order, the user can view image data sets obtained through the image reading in a state wherein the image data sets are classified according to the recording media information.

By using the system described in U.S. Patent Application Publication No. 20030151767, image data obtained by readout can be provided to a user by being recorded in a recording medium such as a DVD-R. At this time, image data in the form of a slide show can be generated from the image data obtained by reading, and can be recorded in the recording medium together with the original image data. In this manner, the user can enjoy the slide show by using his/her DVD player and can appreciate the image data by using his/her terminal such as a personal computer.

Since the recording medium provided to the user in the photo mining service has a large amount of image data, the data may include images that the user is not willing to view or show to others. In addition, the data may include images representing people in too small sizes. Therefore, the slide show may include the images that are not preferred by the user, which may spoil fun of the slide show. Furthermore, since the slide show generated in this manner is represented as a set of data, the user cannot edit the data even if the user wishes to change reproduction order in the slide show.

In addition, although the image data of the slide show include background music played in reproduction of the slide show, the slide show includes only predetermined music. For this reason is desired inclusion of background music in accordance with the content of the slide show or the preferences of the user.

SUMMARY OF THE INVENTION

The present invention has been conceived based on consideration of the above circumstances. An object of the present invention is therefore to enable generation of a slide show in reproduction order desired by a user without spoiling fun of the slide show for the user.

Another object of the present invention is to enable inclusion of background music in a slide show image in accordance with the content thereof and the preferences of a user.

A first slide show generation apparatus of the present invention is a slide show generation apparatus for generating an image of slide show from an image group comprising a predetermined number of images, and the first slide show generation apparatus comprises:

image selection means for selecting the predetermined number of images from a plurality of images whose quantity is larger than the predetermined number;

reproduction order setting means for setting reproduction order of the predetermined number of images;

change reception means for receiving change of the reproduction order and change in any one or more of the images in the image group, from a user; and generation means for generating the image of slide show based on the changed image group and the changed reproduction order.

In the first slide show generation apparatus of the present invention, the generation means may generate a simplified slide show image in a size that is smaller than that of the image of slide show, based on the image group before the change and the reproduction order before the change. In this case, the first slide show generation apparatus of the present invention further comprises storage means for storing the plurality of images, the simplified slide show image, and information representing the reproduction order in an externally accessible manner.

In the case where the plurality of images are added with photography date information representing date of photography of each of the images, the first slide show generation apparatus of the present invention may further comprise information changing means for changing the photography date information added to the image or images whose reproduction order has been changed, based on the photography date information added to the images immediately before and after the image or images in the changed reproduction order.

A first slide show generation method of the present invention is a method for generating an image of slide show from an image group comprising a predetermined number of images, and the method comprises the steps of:

selecting the predetermined number of images from a plurality of images whose quantity is larger than the predetermined number;

setting reproduction order of the predetermined number of images;

receiving change of the reproduction order and change of any one or more of the images in the image group, from a user; and generating the image of slide show based on the changed image group and the changed reproduction order.

The first slide show generation method of the present invention may be provided as a program for causing a computer to execute the method.

According to the first slide show generation apparatus and the first slide show generation method of the present invention, the change in the predetermined number of images in the image group comprising the image of slide show and the change in the reproduction order in the slide show are received from the user, and the slide show image is generated from the changed image group and in the changed reproduction order. Therefore, any one or more of the images that is/are not preferable for the user can be deleted from the slide show image while any one or more of the images that is/are preferable for the user can be included in the slide show image. Furthermore, the images can be re-arranged in the order desired by the user.

In the case where the simplified slide show image having a smaller size than the slide show image is generated from the image group before the change and in the reproduction order before the change so that the simplified slide show image and the information on the reproduction order can be stored in addition to the images in an externally accessible manner, the user can easily understand the images included in the slide show image, the images that can be included in the slide show image, and the reproduction order thereof. Therefore, the user can change any one or more of the images included in the image group and the reproduction order with ease.

In the case where the photography date information representing the date of photography is added to each of the images, the photography date information added to any one or more of the images whose reproduction order has been changed may be changed based on the photography date information added to the images immediately before and after the image or images in the changed reproduction order. In this manner, the photography date information added to the image or images can be changed especially in the case where the photography date information thereof represents a wrong photography date.

A second slide show generation apparatus of the present invention is a slide show generation apparatus for generating a slide show image from a plurality of images, and the second slide show generation apparatus comprises:

a first selection means for making selection of at least one of musical pieces that can be included in the slide show image from the musical pieces, based on information on at least one of: date of photography of each of the images, a photography location thereof, information on a user requesting generation of the slide show image, and a story of the images inferred from the images;

list generation means for generating a list of the selected musical piece or pieces;

a second selection means for receiving further musical piece selection from the list; and generation means for generating the slide show image including the further selected musical piece or pieces.

The information on the user refers to information that can reflect the preferences of the user. More specifically, information on date of birth, gender, family composition, and a hobby of the user may be used as the information on the user.

A second slide show generation method of the present invention is a method for generating a slide show image from images, and the second slide show generation method comprises the steps of:

making selection of at least one of musical pieces that can be included in the slide show image from the musical pieces, based on information on at least one of: date of photography of each of the images, a photography location thereof, information on a user requesting generation of the slide show image, and a story of the images inferred from the images;

generating a list of the selected musical piece or pieces;

receiving further musical piece selection from the list; and generating the slide show image including the further selected musical piece or pieces.

The second slide show generation method of the present invention may be provided as a program for causing a computer to execute the method.

Note that the programs of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless communication means is also within the scope of this invention. Additionally, computer instructions include, but are not limited to: source, object, and executable code, and can be in any language, including higher level languages, assembly language, ad machine language.

According to the second slide show generation apparatus and the second slide show generation method of the present invention, the musical piece or pieces to be included in the slide show image is/are selected from the musical pieces based on the information on at least one of: the photography date of the images included in the slide show, the photography location thereof, the information on the user requesting generation of the slide show image, and the story inferred from the images, and the list of the selected musical piece or pieces is generated. Further musical piece selection from the list is then received, and the selected musical piece or pieces is/are included in the slide show image. Therefore, the slide show image generated in this manner includes the musical piece or pieces in accordance with a year range or the location of the images, or the user information, or the story inferred from the images. Consequently, background music can be played in reproduction of the slide show image, reflecting the preferences of the user and the content of the images.

BRIEF DESCRIPTION OF THE DRAWINGS

FIG. 9 shows an example of title list;

FIG. 10 is a flow chart showing a procedure carried out in a digitalization center after classification in the second embodiment;

FIG. 11 is a flow chart showing a procedure carried out after a photo mining server is notified of storage of the title list in the second embodiment; and FIG. 12 is a flow chart showing a procedure carried out by a user at the time of generation of DVD-Video files in the second embodiment.

DESCRIPTION OF THE PREFERRED EMBODIMENTS

Hereinafter, an embodiment of the present invention will be described with reference to the accompanying drawings.

Figure 1:
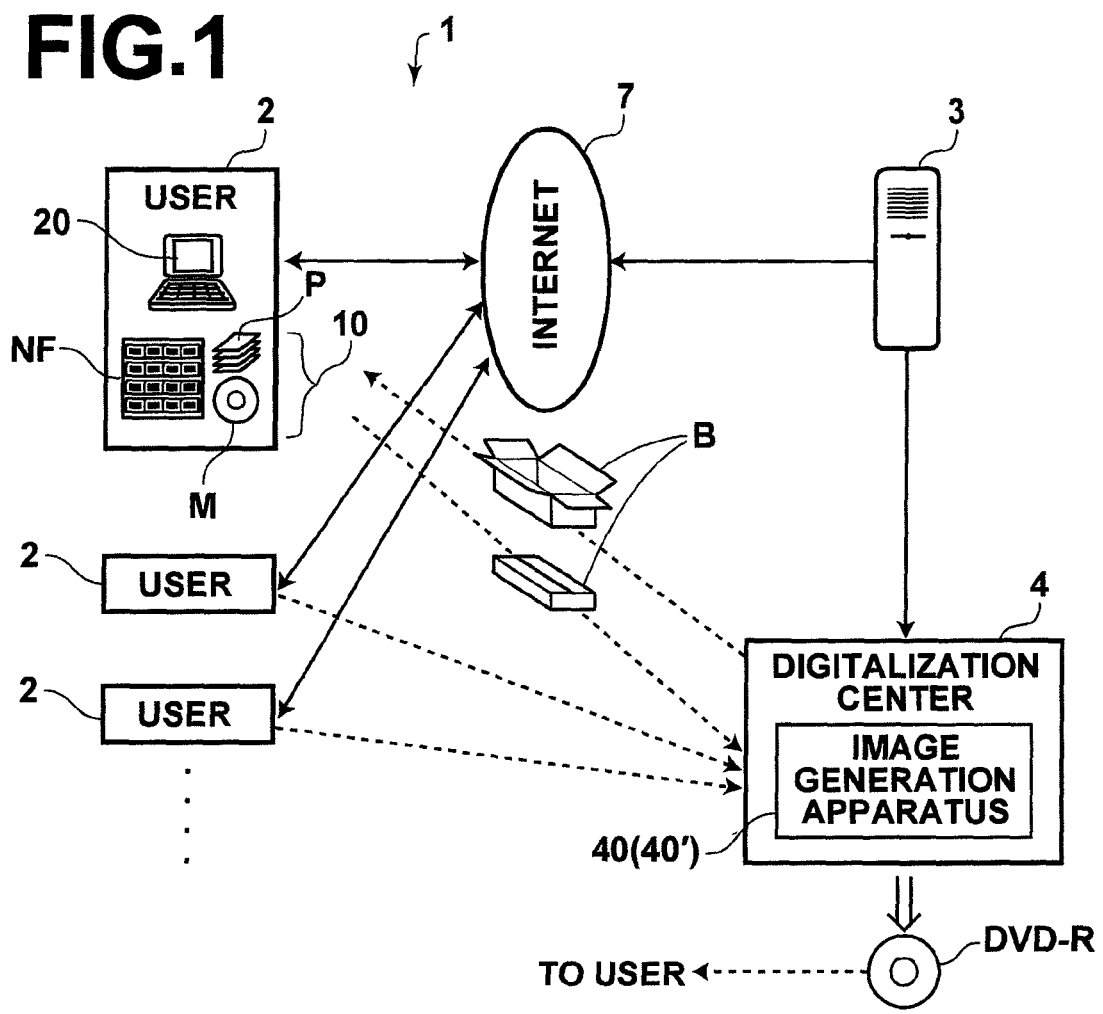
FIG. 1 shows the configuration of a photo mining system adopting a slide show generation apparatus of a first embodiment of the present invention.

FIG. 1 shows the configuration of a photo mining system adopting a slide show generation apparatus of a first embodiment of the present invention. As shown in FIG. 1, various kinds of information, negative films, prints, and the like are exchanged in a photo mining system 1 between users 2, a photo mining server 3 (hereinafter referred to as the PM server 3) that receives an order for a photo mining service placed by any one of the users 2 (hereinafter referred to as the user 2) via the Internet, and a digitalization center 4 that deals with the order.

In the photo mining service in this embodiment, image data sets S0 are obtained from negative films NF, prints P, and recording media M such as a CD-R and a memory card owned by the user 2. The image data sets S0 are recorded in a recording medium such as a DVD-R (in this embodiment, the recording medium is a DVD-R) together with a DVD-Video file or DVD-Video files (hereinafter referred to as DVD-Video files V0) enabling reproduction of a slide show or slide shows generated from the image data sets S0. The DVD-R is then provided to the user 2.

The user 2 owns the negative films NF and the prints P without classification thereof, and stores a large amount of image data sets that are not set in order in the recording media M. The user 2 places the order for the photo mining service from the PM server 3 regarding the large amount of the negative films NF, the prints P, and the recording media M. More specifically, the user 2 has a user terminal 20 such as a personal computer connected to the Internet 7, and accesses the PM server 3 by using the user terminal 20 for placing the order.

The photo mining system 1 in this embodiment is limited to use by members only, and the user 2 has registered himself/herself with the PM server 3 to obtain a user ID and a password for identification. At the time of membership registration, the user 2 registers user information comprising items such as the name, the address, age, the phone number, the e-mail address, and family composition thereof. The user information is stored in the PM server 3 and in a user information database in the digitalization center 4 as will be described later.

The PM server 3 has a Web site for receiving the order for the photo mining service placed by the user 2. The user 2 accesses the Web site of the PM server 3 by using the user terminal 20, and inputs the user ID and the password for placing the order. The PM server 3 issues an order number upon reception of the order, and sends to the user 2 an e-mail message that notifies the user 2 of the order number and date of delivery, for confirmation of order reception. The PM server 3 sends notification of reception of the order to the digitalization center 4, and the notification includes the user information, the order number, the date of delivery, and date of order reception.

When the notification of order reception is received from the PM server 3, an operator in the digitalization center 4 sends a delivery box B to the address of the user 2 with reference to the user information included in the notification and the user information database stored in the digitalization center 4 so that the user 2 can send the negative films NF, the prints P, and the recording media M (hereinafter collectively referred to as recording media 10) owned by the user 2 to the digitalization center 4. An order form recorded with information on the order number and the like of the user 2 is also sent to the user 2, together with the delivery box B. The order form is also pasted on the delivery box B. A bar code corresponding to the order number is printed on the order form. The delivery box B may be sent by a company other than the digitalization center 4.

When the user 2 receives the delivery box B, the user 2 encloses the recording media 10 of his/her own in the delivery box B, and sends the delivery box B to the digitalization center 4. At this time, the user 2 describes the type and quantity of the recording media 10, a comment, and the like on the order form, and sends the order form to the digitalization center 4.

When the delivery box B is received, the digitalization center 4 carries out processing for the photo mining service by using an image generation apparatus 40.

Figure 2:
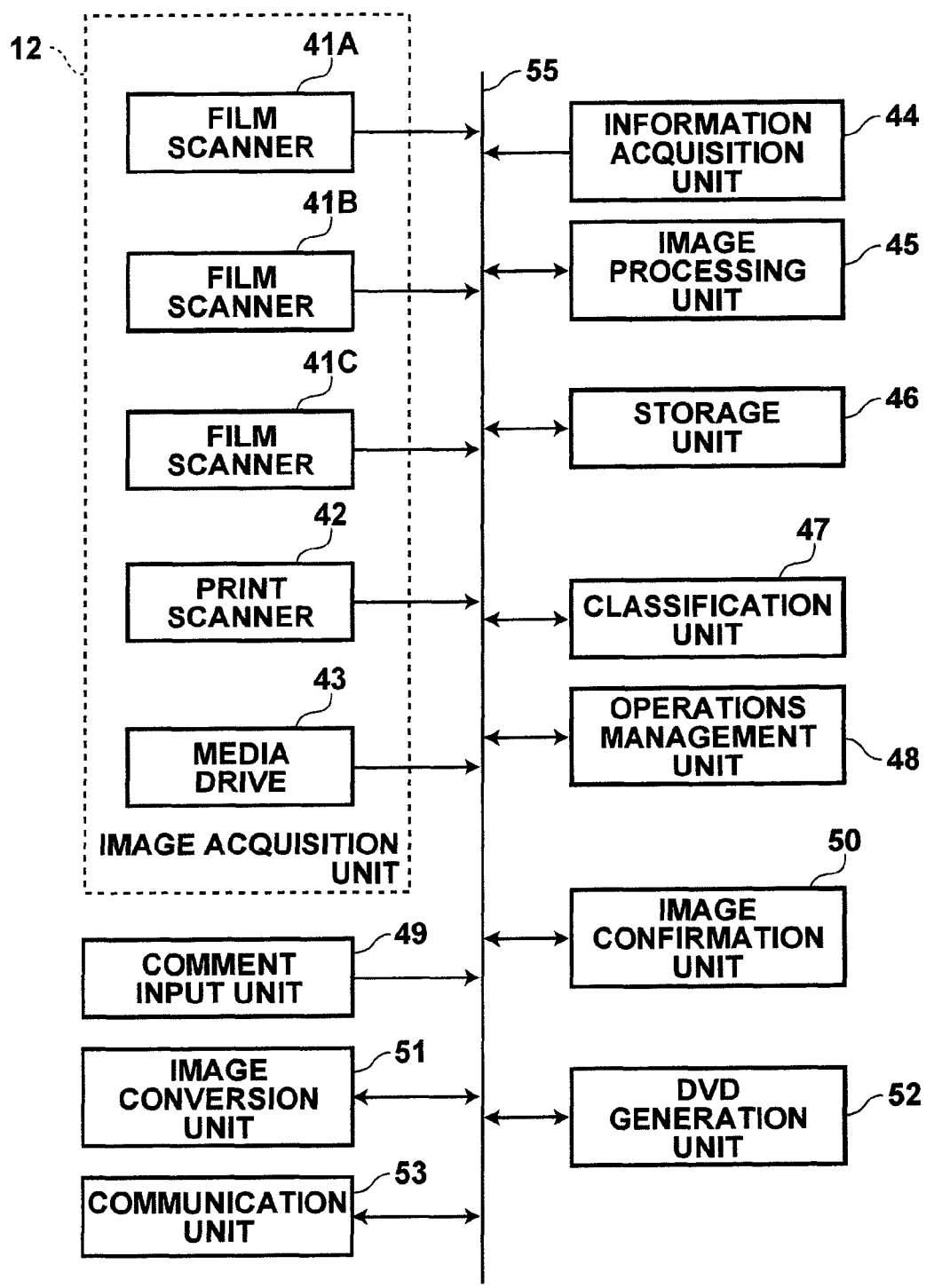
FIG. 2 is a block diagram showing the configuration of an image generation apparatus in the first embodiment.

FIG. 2 is a block diagram showing the configuration of the image generation apparatus 40. The image generation apparatus 40 obtains the image data sets S0 from the recording media 10, and generates the DVD-R recorded with the image data sets. As shown in FIG. 2, the image generation apparatus 40 comprises three film scanners 41A~41C for obtaining the image data sets S0 by reading images recorded on the negative films NF, a print scanner 42 for obtaining the image data sets S0 by reading images recorded on the prints P, a media drive 43 for obtaining the image data sets S0 by reading the image data sets S0 from the recording media M, an information acquisition unit 44 that obtains information on date of photography (hereinafter referred to as the photography date information D) from the negative films NF and the prints P and from the image data sets S0 read from the recording media M and obtains various kinds of information to be added to the image data sets S0, an image processing unit 45 for obtaining processed image data sets S1 by carrying out image processing and image restoration processing such as red-eye correction processing on the image data sets S0, and a storage unit 46 for storing various kinds of information including the processed image data sets S1.

The image generation apparatus 40 further comprises a classification unit 47 for assigning any one of the film scanners 41A~41C, the print scanner 42, or the media drive 43 (hereinafter collectively referred to as an image acquisition unit 12) to obtain the image data sets S0 from the recording media 10 sent by the user 2, an operations management unit 48 for managing the type of the image acquisition unit 12 used for obtaining the image data sets S0 from the recording media 10 for each of processes of acquisition (hereinafter referred to as a job), a comment input unit 49 for receiving input of a comment on the images for each of the jobs or for each of the images, an image confirmation unit 50 for confirming and correcting the images represented by the processed image data sets S1, an image conversion unit 51 for converting the image data sets S1 into image data sets S2 of Exif format by adding various kinds of information such as the comment to the corresponding image data sets S1, a DVD generation unit 52 for generating the DVD-Video files V0 in the form of slide shows from the image data sets S2 and for generating the DVD-R recorded with the image data sets S2 and the DVD-Video files V0, and a communication unit 53 for communicating with the PM server 3.

The components in the image generation apparatus 40 are connected by a bus 55.

Each of the film scanners 41A~41C sequentially reads the images recorded on the negative films NF, and obtains the image data sets S0 representing the images.

The print scanner 42 obtains the image data sets S0 representing the images printed on the prints P by reading the prints P.

The media drive 43 obtains the image data sets S0 by reading the image data sets S0 from the recording media M. Since the type of the recording media M varies, the media drive 43 of the type corresponding to the recording media M available on the market is used.

The information acquisition unit 44 obtains the photography date information D from the negative films NF, the prints P, and the like. Each of the negative films NF is recorded with a code number specific thereto (hereinafter referred to as a DX code). By referring to the DX code, a year range in which the film was produced can be inferred. Therefore, the information acquisition unit 44 reads the DX code recorded on each of the negative films NF, and obtains the photography date information D representing the year range of production of the corresponding negative film NF by referring to a year range database stored in the storage unit 46.

In the case where the negative films NF include so-called APS films each having a magnetic coating for recording magnetic information, the date of photography can be recorded as magnetic information in the magnetic coating. In this case, the photography date information D can be obtained by reading the magnetic information representing the date of photography recorded in the magnetic coating thereof.

In the case where the date is printed in each of the images, the date is read and character recognition is carried out thereon for obtaining the photography date. In this case, information obtained by reading the date printed in each of the images can be used as the photography date information D. In some cases, the date is hard to read, depending on the images. In such a case, the photography date information D of each of the images whose photography date was not readable may be obtained based on the date of photography readable from the images arranged immediately before and after the image in a sequence of image reading.

For the prints P, the date of photography is known by reading the date printed in each of the prints P and by carrying out character recognition thereon if the date is printed on each of the prints P. In this case, information obtained by reading the date in each of the prints P can be used as the photography date information D.

In the case where some of the prints P have white margins, information representing a year range in which the corresponding prints P were printed, such as "Fujicolor 99", may be present therein. Furthermore, the information representing the year range (such as a brand mark varying according to year of production) may be printed on the backside of the prints P. In such a case, information obtained by reading the margin or the backside and carrying out character recognition thereon may be used as the photography date information D.

In some cases, the user 2 has written the date of photography on film storage sheets, a bag containing the sheets, and/or on the backside of the prints P. Furthermore, the user 2 may have written the date of photography on the order form for each of the recording media 10. In such a case, the comment input unit 49 or the like may receive input of the date from the operator in the digitalization center 4, and the date is used as the photography date, information D.

For the image data sets S0 read from the recording media M, the photography date information is described in a tag of each of the image data sets S0. Therefore, the photography date information D is obtained based on the information described in the tag.

As has been described above, the photography date information D can be obtained from the various sources such as the DX code, the date printed in each of the images, the date specified by the user 2, the information recorded on the margin or backside of the prints P, and the information in the tag. Therefore, priority of the sources is preferably determined so that the photography date information D can be obtained according to the priority. At this time, it is preferable for the sources to be recognizable. Alternatively, the photography date information D may be obtained in relation to each of the sources available, without determination of the priority in advance. The higher the priority of each of the sources is, the more reliable the photography date information D obtained from the source becomes. Therefore, a degree of reliability of the photography date information D may be generated according to each of the information sources.

In addition to the photography date information D, the information acquisition unit 44 obtains the various kinds of information such as a frame number in the case of reading the negative films NF, and the type of the recording media 10 (either the negative films NF, the prints P, or the recording media M) from which the image data sets S0 were obtained, and generates pertinent information including the photography date information D. In the case where the reliability is generated, the pertinent information includes the reliability.

The photography date information D obtained by the information acquisition unit 44 may be obtained at the same time as acquisition of the image data sets S0 by the image acquisition unit 12. In this case, the information acquisition unit 44 is installed together with the image acquisition unit 12, and an operator of the image acquisition unit 12 operates the information acquisition unit 44.

The image processing unit 45 obtains the processed image data sets S1 by carrying out image quality enhancement processing such as gradation processing, color conversion processing, and sharpness processing on the image data sets S0.

The storage unit 46 comprises a large-capacity hard disc, and temporarily stores the processed image data sets S1 as well as the image data sets S0 obtained by the film scanners 41A~41C, the print scanner 42, and the media drive 43. In addition, the storage unit 46 stores the user information database and the year range database representing a relationship between the DX code and the year range of production of the films and a relationship between the brand mark of the prints and the year range of use of the brand mark. The storage unit 46 also stores simplified files V1 of the DVD-Video files V0 that are generated as will be described later, in a state where the user 2 can access the simplified files V1 by using the user terminal 20. The storage unit 46 further stores the image data sets S2 that will be described later.

The information acquisition unit 44 reads the DX code recorded on each of the negative films NF, and can obtain the photography date information D representing the year range in which the corresponding negative film NF was produced, with reference to the year range database. The information acquisition unit 44 also reads the brand mark printed on the backside of each of the prints P, and can obtain the photography date information D representing the year range in which the brand mark was used, with reference to the year range database.

The classification unit 47 assigns which of the parts in the image acquisition unit 12 obtains the image data sets S0 for each of the recording media 10 according to an instruction input by an operator.

The operations management unit 48 manages processing for the photo mining service carried out by the digitalization center 4. More specifically, the operations management unit 48 manages the entire processing carried out in the photo mining service, such as order reception, delivery of the delivery box B, receipt of the delivery box B, classification, acquisition of the image data sets S0, image processing, comment input, image confirmation, image conversion, DVD generation, DVD delivery, and payment reception, for each order number for each of the users 2.

The comment input unit 49 receives input of the comment for the image data sets. The comment can be the name of an event described by the user 2 on the film storage sheets of the negative films NF or on the backside of the prints P or on the order form, for example.

The image confirmation unit 50 is used for confirmation and correction of the image data sets S1 having been subjected to the image processing.

The image conversion unit 51 converts the image data sets S1 having been subjected to the image confirmation into the image data sets S2 in Exif format by adding the information registered with an operations management database for each of the images as a tag to the corresponding image data sets S1. At this time, the image conversion unit 51 carries out the conversion into the image data sets S2 by rotating the image data sets S1 whose orientation needs to be changed.

The DVD generation unit 52 records all the image data sets S2 generated by the image conversion unit 51 in the DVD-R, and calculates a total free space size in the DVD-R in the case where all the image data sets S2 are recorded in the DVD-R. The DVD generation unit 52 generates the DVD-Video files V0 whose size is appropriate for the free space size, and records the DVD-Video files V0 in the DVD-R. Hereinafter, how the DVD-Video files V0 are generated will be described.

The DVD generation unit 52 generates a list of year range information on all the image data sets S2, based on the photography date information D described in the tag of each of the image data sets S2. At this time, the list does not include a part of the image data sets S2 whose exclusion from the slide shows has been instructed via the image confirmation unit 50.

The DVD generation unit 52 then calculates the free space size of the DVD-R by subtracting a total size of the image data sets S2 from the capacity of the DVD-R. It is preferable for the free space size to have some margin. The number of the image data sets S2 appropriate for the free space size is then calculated, and the calculated number of the image data sets S2 are selected. A part of the image data sets S2, whose inclusion in the slide shows has been instructed, is necessarily selected. MPEG files in which the images are changed serially are generated from the selected image data sets S2, and authoring is carried out through inclusion of a title menu and background music. In this manner, the DVD-Video files V0 are generated.

The part of the image data sets S2 to be included in the DVD-Video files V0 is selected with reference to the list. For example, the image data sets S2 are classified according to year ranges based on the date of photography represented by the photography date information D described in the tag of each of the image data sets S2. A number of the image data sets S2 are selected evenly from the respective year ranges, and arranged in order of the year ranges to form the DVD-Video files V0.

The DVD generation unit 52 also generates the simplified files V1 having smaller sizes than the corresponding DVD-Video files V0, and stores the simplified files V1 in the storage unit 46. The simplified files V1 are generated by reducing the sizes of the images included in the DVD-Video files V0 or by degrading image quality thereof. The DVD generation unit 52 further generates reproduction order files R0 describing reproduction order of the image data sets S2 in the corresponding DVD-Video files V0, and stores the reproduction order files R0 in the storage unit 46. Furthermore, the DVD generation unit 52 generates simplified image data sets S2' having smaller sizes than the corresponding image data sets S2, and stores the simplified image data sets S2' in the storage unit 46. Instead of the simplified image data sets S2', the image data sets S2 including characters "Sample" or the like may be generated and stored.

After the simplified image data sets S2', the simplified files V1, and the reproduction order files R0 have been stored in the storage unit 46, the digitalization center 4 notifies the PM server 3 of this fact. An e-mail message is then sent to the user 2, describing URL of where the simplified image data sets S2', the simplified files V1, and the reproduction order files R0 are stored, and an ID and a password for accessing the URL. The user 2 accesses the URL by using the user terminal 20, and can obtain the simplified image data sets S2, the simplified files V1, and the reproduction order files R0. In this manner, the user 2 can confirm the images and the reproduction order of the images in the slide shows represented by the DVD-Video files V0, by using the user terminal 20.

The user 2 can also instruct to include any one or more of the images that is/are not included in the slide shows but the user 2 wishes to include therein (hereinafter simply referred to as an insertion image), and can instruct to delete any one or more of the images in the slide shows (hereinafter simply referred to as a deletion image). For this instruction, the user 2 sends to the PM server 3 an e-mail message describing the file name of the image data sets S2 representing the insertion or deletion image, and an insertion position at which the insertion image is inserted (such as the file name of the image data set S2 of the image before or after which the insertion image is inserted). The user 2 can also instruct to change the reproduction order in the slide shows. For this instruction, the user 2 describes in an e-mail message the file name of the image data set S2 representing the image whose reproduction order is changed (hereinafter referred to as an order change image), and the file name of the image data set S2 representing the image before or after which the order change image is to be inserted, and sends the e-mail message to the PM server 3. Hereinafter, the processing carried out by the user 2 is referred to as editing processing and the content described in the e-mail message is referred to as an editing result.

The slide show reproduction order is changed in the case where the year ranges of the images to be reproduced are arranged in erroneous order, for example.

Upon reception of the e-mail message informing the change, the PM server 3 forwards the e-mail massage to the digitalization center 4. An operator in the digitalization center 4 generates new DVD-Video files V0 by deleting the deletion image from the old DVD-Video files V0, adding the insertion image at the specified position, and by changing the reproduction order while referring to the e-mail message.

In the slide shows represented by the DVD-Video files V0, the images are changed in chronological order. Therefore, in the case where the user 2 has instructed to change the reproduction order, the order of year ranges of the images to be reproduced is not correct. This fact proves that the photography date information D of the order change image is not correct. For this reason, in the case where the operator has changed the reproduction order in the slide shows, the DVD generation unit 52 changes the photography date information D included in the pertinent information and added to the order change image, according to the photography date information D added to the images immediately before and after the order change image in the changed reproduction order.

Figure 3:
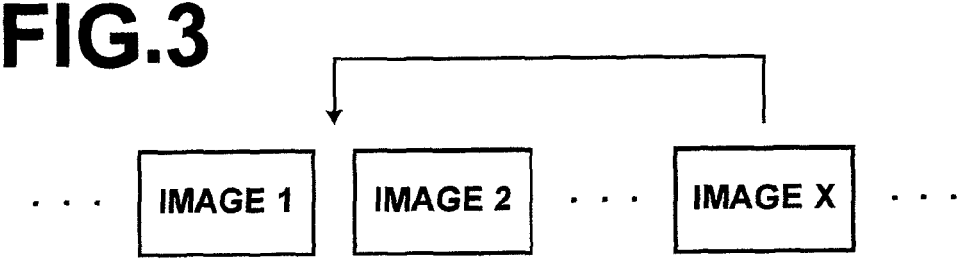
FIG. 3 is a diagram for explaining a change in photography date information.

FIG. 3 is a diagram for explaining a change in the photography date information D. In FIG. 3, the date of photography represented by the photography date information D of an image 1, an image 2, and an image X is Jan. 21, Jan. 25, and Feb. 25 of 2005, and the image X has been changed to be reproduced between the images 1 and 2. The date of photography of the image X is supposed to be between Jan. 21 and 25 of 2005. Therefore, the DVD generation unit 52 changes the photography date information D included in the pertinent information of the image X and added to the image X to represent a date between 21 and 25 of January (such as Jan. 23, 2005).

The photography date information D has been changed according to the instruction by the user. Therefore, it is preferable for the priority to become the highest regarding the information source of the corresponding photography date information D. In the case where the reliability is generated, it is also preferable for the reliability thereof to be the highest.

In the case where the image X has been obtained from any one of the negative films NF, the photography date information D of the image X may be changed according to the photography date information D of the images obtained from the same negative film as the image X.

The DVD generation unit 52 stores the image data sets S2 in the DVD-R by recording the image data sets S2 in folders in which the image data sets S2 have been classified, by using a DVD drive. The DVD generation unit 52 also records the newly generated DVD-Video files V0 in the DVD-R.

Figure 4:
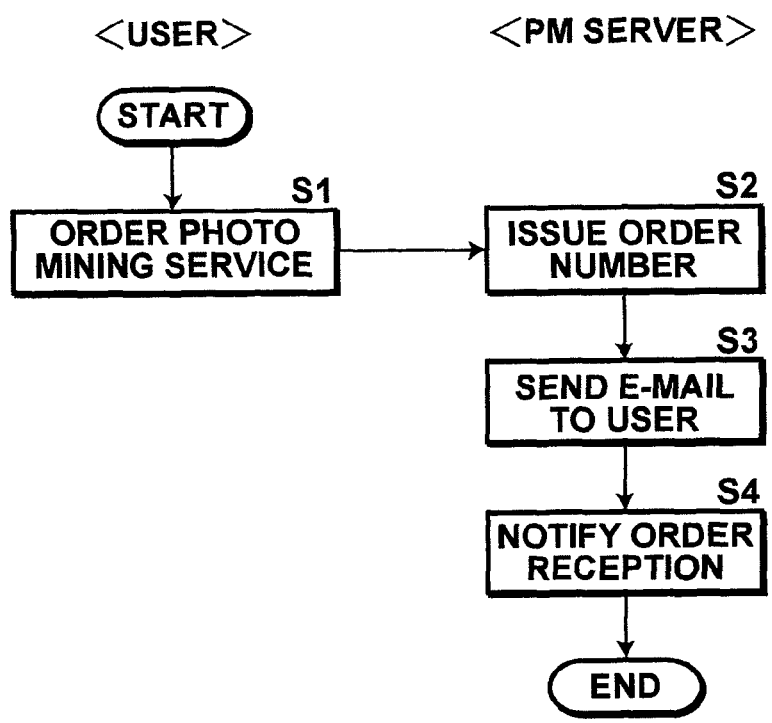
FIG. 4 is a flow chart showing a procedure carried out at the time an order is placed for a photo mining service in the first embodiment.

Procedures carried out in the first embodiment will be described next. FIG. 4 is a flow chart showing a procedure carried out at the time the user 2 places the order for the photo mining service in the first embodiment. When the user 2 accesses the web site of the PM server 3 by using the user terminal 20 and inputs the user ID and the password for causing the PM server 3 to authenticate the user 2, the procedure starts. The user 2 places the order for the photo mining service from the web site (Step S1). When the PM server 3 receives the order, the PM server 3 issues the order number (Step S2). The PM server 3 then sends the e-mail message notifying the user 2 of the order number and the date of delivery to the user 2 (Step S3). The PM server 3 notifies the digitalization center 4 of reception of the order (Step S4) to end the procedure.

When the operator in the digitalization center 4 receives the notification of order reception from the PM server 3, the operator issues the order form by using the operations management unit 48, and sends the order form together with the delivery box B to the user 2.

The user 2 receives the delivery box B and encloses in the delivery box B the recording media 10 regarding which the photo mining service is requested, and sends the box B to the digitalization center 4.

When the digitalization center 4 receives the delivery box B, the digitalization center 4 carries out the processing for the photo mining service, by using the image generation apparatus 40.

Figure 5:
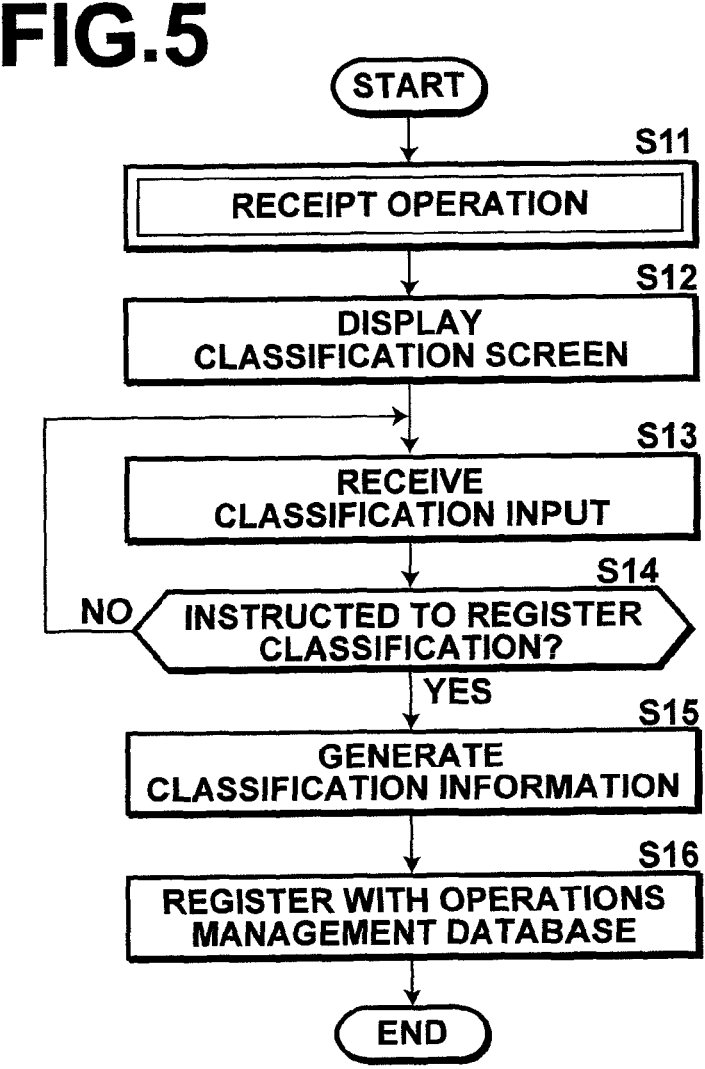
FIG. 5 is a flow chart showing a procedure in classification carried out in a digitalization center in the first embodiment.

FIG. 5 is a flow chart showing a procedure carried out in the digitalization center 4 at the time of classification. In FIG. 5, processing carried out by the operator is shown by double lines. The operator firstly carries out receipt operation (Step S11). The operator opens the delivery box B, and confirms the content therein for classification. At this time, a classification screen is displayed on a display unit of the classification unit 47 (Step S12), and an instruction input by the operator is received for classification (Step S13). Whether the operator has input an instruction to register the classification is judged (Step S14). If a result at Step S14 is affirmative, classification information representing a result of the classification is generated (Step S15). The operations management unit 48 registers the classification information with the operations management database (step S16) to end the classification procedure.

Figure 6:
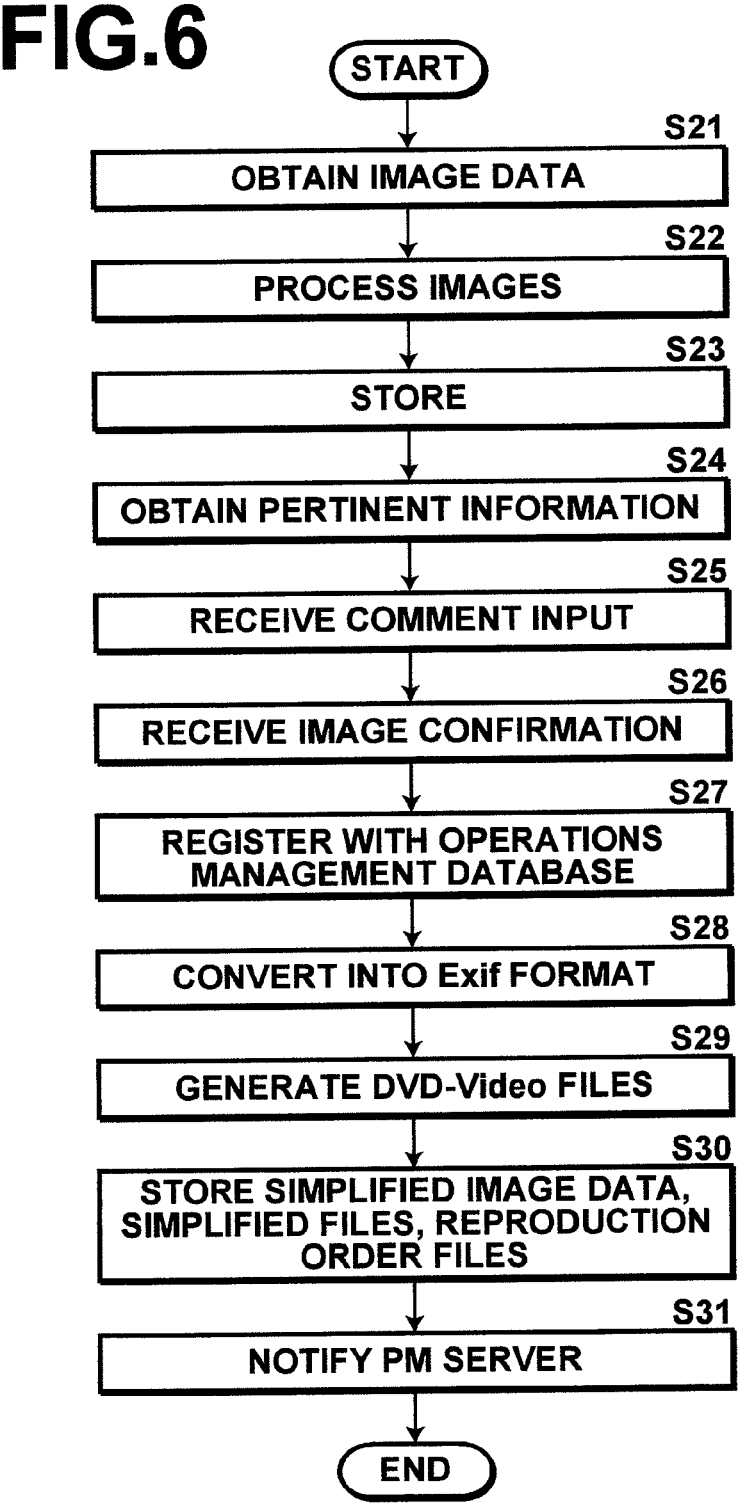
FIG. 6 is a flow chart showing a procedure carried out in the digitalization center after the classification in the first embodiment.

FIG. 6 is a flow chart showing a procedure carried out in the digitalization center 4 after the classification. After the classification, the image acquisition unit 12 obtains the image data sets S0 (Step S21), and the image processing unit 45 carries out the image processing for obtaining the processed image data sets S1 (Step S22). The storage unit 46 stores the image data sets S1 (Step S23). The information acquisition unit 44 obtains the pertinent information including the photography date information D (step S24), and the comment input unit 49 receives the comment input by the operator (Step 25) after acquisition of the image data sets S1.

The image confirmation unit 50 receives image confirmation regarding orientation registration, comment correction, and inclusion or exclusion of each of the images, from the operator (step S26). The operations management unit 48 registers the pertinent information, the comment, and information on orientation and the like with the operations management database (Step S27).

The image conversion unit 51 converts the image data sets S1 into the image data sets S2 of Exif format, by adding the information registered with the operations management database as the tag of each of the image data sets S1 (Step S28). The DVD generation unit 52 generates the DVD-Video files V0 in the form of slide shows, from the selected part of the image data sets S2 (Step S29). The DVD generation unit 52 also generates the simplified image data sets S2', the simplified files V1, and the reproduction order files R0, and stores these in the storage unit 46 (Step S30). The DVD generation unit 52 notifies this fact to the PM server 3 (Step S31) to end the procedure.

Figure 7:
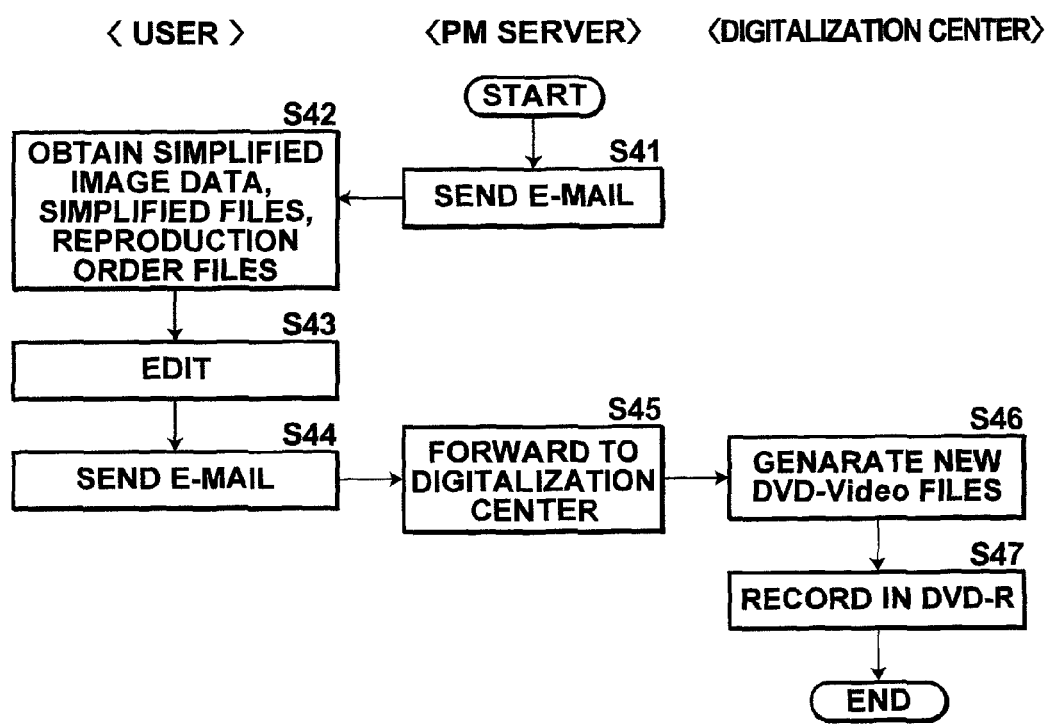
FIG. 7 is a flow chart showing a procedure carried out after a photo mining server is notified of storage of simplified image data sets, simplified image files, and reproduction order files in the first embodiment.

FIG. 7 is a flow chart showing a procedure carried out after the PM server 3 has been notified of storage of the simplified image data sets S2', the simplified files V1, and the reproduction order files R0. The PM server 3 starts the procedure after receiving the notification of storage, and sends the e-mail message describing the URL where the simplified image data sets S2', the simplified files V1, and the reproduction order files R0 are stored and the ID and the password for accessing these (Step S41). When the user receives the e-mail message, the user 2 obtains the simplified image data sets S2', the simplified files V1, and the reproduction order files R0 by accessing the URL (Step S42). The user 2 then carries out the editing processing for inclusion of the insertion image or deletion of the deletion image in the slide shows or for changing the reproduction order, by referring to the simplified image data sets S2', the simplified files V1, and the reproduction order files R0 (Step S43). The user 2 sends the e-mail message including the editing result to the PM server 3 (Step S44).

When the PM server 3 receives the e-mail message including the editing result, the PM server 3 forwards the e-mail message to the digitalization center 4 (Step S45). The operator in the digitalization center 4 refers to the e-mail message, and deletes the deletion image from the DVD-Video files, inserts the insertion image at the specified position, and changes the reproduction order for generating the new DVD-Video files V0 (Step S46). The DVD generation unit 52 records the image data sets S2 and the new DVD-Video files V0 in the DVD-R (Step S47) to end the procedure.

The DVD-R generated in this manner is sent to the user 2 who placed the order.

The user 2 can enjoy the slide shows by reproducing the DVD-Video files V0 recorded in the DVD-R. Furthermore, the user 2 can display a list of the image data sets S2 recorded in the DVD-R, and can process the image data sets S2.

As has been described above, in the first embodiment, the changes in the images included in the DVD-Video files V0 and in the reproduction order are received from the user, and the new DVD-Video files V0 are generated according to the changed images and the changed reproduction order. Therefore, the image not preferable for the user can be deleted from the slide shows or the image preferred by the user can be included therein. Furthermore, the images included in the slide shows can be arranged in the reproduction order desired by the user.

Furthermore, the simplified image data sets S2', the simplified files V1, and the reproduction order files R0 are stored in the manner accessible by the user 2. Therefore, the user 2 can easily understand the images included in the DVD-Video files V0, the images that can be included therein, and the reproduction order thereof. In this manner, the user 2 can easily change the images or the reproduction order in the DVD-Video files V0.

In addition, by changing the photography date information D of the order change image according to the photography date information D added to the images reproduced immediately before and after the order change image in the changed reproduction order, the date of photography represented by the photography date information D added to the order change image can be corrected especially in the case where the date of photography thereof is wrong.

In the first embodiment described above, the photography date information D of the order change image is changed. However, only the reproduction order may be changed without the change in the photography date information D.

In the embodiment described above, the simplified image data sets S2', the simplified files V1, and the reproduction order files R0 are stored in the manner accessible by the user 2. However, the image data sets S2 and the DVD-Video files V0 may be stored in a manner accessible by the user 2.

A photo mining system adopting a slide show generation apparatus of a second embodiment of the present invention will be described next. The configuration of the photo mining system adopting the slide show generation apparatus in the second embodiment is the same as the first embodiment, except for processing carried out by an image generation apparatus. Therefore, detailed description thereof is omitted.

Figure 8:
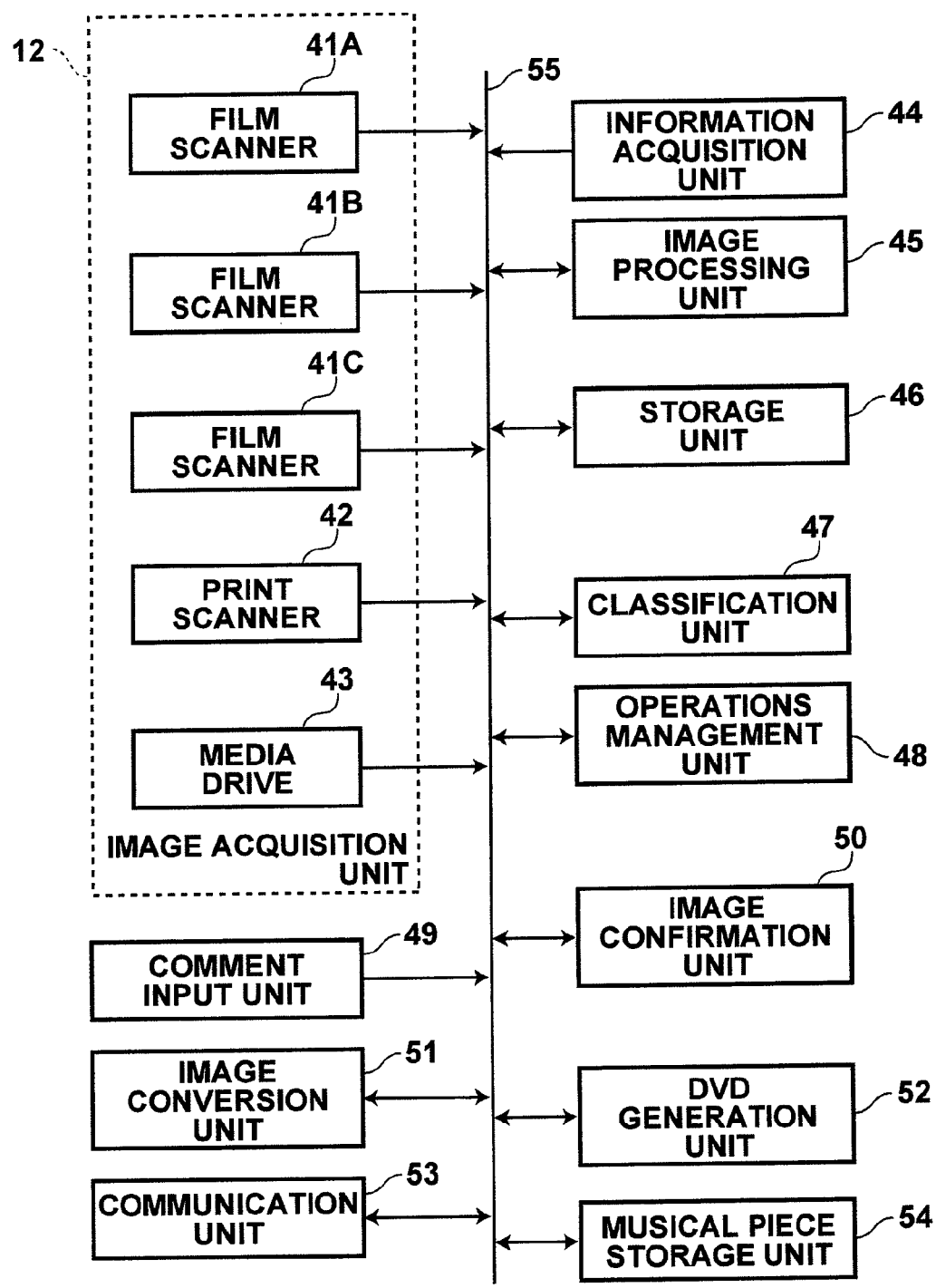
FIG. 8 is a block diagram showing the configuration of an image generation apparatus in a second embodiment of the present invention.

FIG. 8 is a block diagram showing the configuration of an image generation apparatus 40' in the second embodiment. In the image generation apparatus 40', the same elements as in the image generation apparatus 40 in the first embodiment have the same reference numbers, and detailed description thereof is omitted. In the second embodiment, the image generation apparatus 40' has a musical piece storage unit 54, which is different from the first embodiment. In addition, the DVD generation unit 52 does not generate the simplified image data sets S2', the simplified files V1, and the reproduction order files R0, which is another difference from the first embodiment.

The musical piece storage unit 54 stores music data sets representing various kinds of music. Each of the music data sets is added with a header in which various kinds of information regarding the music represented by the music data set is described. More specifically, the header describes the title of music represented by the corresponding music data set, the name of a singer, date of release thereof, a category (such as for children, young people, men, and women), a genre, and a rank in song charts, for example. The musical piece storage unit 54 synchronizes with an external music server that distributes the music, and always stores the latest music data sets.

Processing for including background music will be described below. For determining the background music to be included in the DVD-Video files V0 in the second embodiment, the DVD generation unit 52 selects at least one of the music data sets representing a musical piece or musical pieces that was/were popular in the year range/ranges represented by the photography date information D by searching the musical piece storage unit 54 therefor with reference to the photography date information D of at least one of the image data sets S2 included in the list of year range information. This search is carried out by referring to the description in the header of each of the music data sets stored in the musical piece storage unit 54.

For example, in the case where 3 of the music data sets are used as the background music in one of the slide shows comprising 100 images whose reproduction takes 15 minutes, assume that the year range for the $1^{st}$ to $35^{th}$ images is from 1970 to 1980 and the year range for the $36^{th}$ to $70^{th}$ images is from 1981 to 1990 while the year range for the $71^{st}$ to $100^{th}$ images is from 1991 to 2000. In this case, the DVD generation unit 52 uses 1970, 1981, and 1991 as key words for the year ranges, and searches for at least one of the music data sets stored in the musical piece storage unit 54, regarding each of the key words. In this manner, at least one of the music data sets is/are searched for, regarding the year of 1970, 1981, and 1990, respectively. The DVD generation unit 52 generates a list of the music data sets that have been found, and stores the list in the storage unit 46.

FIG. 9 shows an example of the list of the music data sets. As shown in FIG. 9, a title list L0 of the music data sets includes the years 1970, 1981, and 1991, and the titles of the music data sets found therefor (titles A~J in FIG. 9).

After the title list L0 is stored in the storage unit 46, the digitalization center 4 notifies the PM server 3 of this fact, and an e-mail message is sent to the user 2 for describing URL of where the title list L0 is stored and an ID and a password for accessing the URL. The user 2 accesses the URL by using the user terminal 20, and obtains the title list L0. The user selects any one of the music data sets to be included in the DVD-Video file V0, and sends to the PM server 3 an e-mail message including a result of selection (the title of the musical piece selected for each of the years).

When the PM server 3 receives the e-mail message, the PM server 3 forwards the e-mail message to the digitalization centre 4. An operator in the digitalization center 4 refers to the e-mail message, and generates the corresponding DVD-Video file V0 by including the selected music data sets as the background music therein.

In this manner, musical pieces that were popular in the year ranges of the images in the slide shows are included as the background music of the slide shows. Therefore, the user 2 can enjoy the slide shows in an atmosphere reflecting the days.

The DVD generation unit 52 stores the image data sets S2 in the DVD-R by recording the image data sets S2 in the folders in which the image data sets S2 have been classified, by using the DVD drive. The DVD generation unit 52 also records the generated DVD-Video files V0 in the DVD-R.

Procedures carried out in the second embodiment will be described next. In the second embodiment, the procedure carried out at the time the user 2 places the order for the photo mining service and the procedure carried out in the digitalization center 4 at the time of classification are the same as in the first embodiment. Therefore, detailed description thereof is omitted.

FIG. 10 is a flow chart showing a procedure carried out in the digitalization center 4 in the second embodiment after the classification. In FIG. 10, the procedure from Step S51 to S58 is the same as Step S21 to S28 in the first embodiment. After Step S58, the DVD generation unit 52 generates the title list L0 of the music data sets and stores the list in the storage unit 46 (Step S59). The PM server 3 is notified of storage of the title list L0 in the storage unit 46 (Step S60), and the procedure ends.

FIG. 11 shows a procedure carried out after notification to the PM server 3 of storage of the title list L0 in the storage unit 46. The PM server 3 starts the procedure after reception of the notification, and sends to the user 2 the e-mail message including the URL of where the title list L0 is stored and the ID and the password (Step S61). When the user 2 receives the e-mail message, the user 2 accesses the URL, and obtains the title list L0 (Step S62). By referring to the title list L0, the user 2 selects the titles of the music data sets to be included as the background music in the slide shows, and sends the e-mail message including the titles of the selected music data sets to the PM server 3 (Step S63).

When the PM server 3 receives the e-mail message, the PM server 3 forwards the e-mail message to the digitalization center 4 (Step S64). The operator in the digitalization center 4 generates the DVD-Video files V0 including the selected music data sets as the background music therein (Step S65) while referring to the e-mail message. The DVD generation unit 52 records the image data sets S2 and the generated DVD-Video files V0 in the DVD-R (Step S66) to end the procedure.

The DVD-R generated in this manner is sent to the user 2.

The user 2 can enjoy the slide shows by reproducing the DVD-Video files V0 stored in the DVD-R. Furthermore, the user 2 can display the list of the image data sets S2 stored in the DVD-R and can edit the image data sets.

As has been described above, in the second embodiment, the music data sets to be included in the DVD-Video files V0 are selected based on the photography date information D of the image data sets S2 included therein, and the title list L0 of the selected music data sets is generated and provided to the user 2. Therefore, the user can select the desired music data sets in accordance with the year ranges and can include the music data sets in the DVD-Video files V0. In this manner, the DVD-Video files V0 include the music data sets as the background music desired by the user according to the year ranges of the images to be reproduced, and the background music can be played in reproduction of the slide shows according to the preferences of the user and according to the content of the images.

In the second embodiment, the digitalization center 4 generates the DVD-Video files V0. However, the image data sets S2 may be sent to the user terminal 20 so that the user 2 himself/herself can generate the DVD-Video files V0 by using dedicated viewer software. Hereinafter, a procedure carried out in this case will be described.

FIG. 12 is a flow chart showing the procedure carried out in the case where the user 2 himself/herself generates the DVD-Video files V0. The image data sets S2 have been sent to the user terminal 20. The user 2 selects the image data sets S2 to be included in the DVD-Video files V0 (Step S71). The viewer software generates the list of year range information on the selected image data sets S2 (Step S72), and sends the list to the PM server 3 (Step S73).

The PM server 3 forwards the list to the digitalization center 4 (Step S74).

The digitalization center 4 generates the title list L0 in the same manner as in the second embodiment with reference to the list of year range information, and stores the title list L0 in the storage unit 46 (Step S75). The digitalization center 4 then notifies the PM server 3 of storage of the title list L0 in the storage unit 46 (Step S76).

When the PM server 3 receives the notification regarding storage of the title list L0, the PM server 3 sends to the user 2 the e-mail message including the URL of where the title list L0 is stored and the ID and the password to access the URL (Step S77).

The user 2 receives the e-mail message, and accesses the URL to obtain the title list L0 (Step S78). The user 2 selects the titles of the music data sets to be included as the background music in the slide shows while referring to the title list L0, and downloads the selected music data sets from the digitalization center 4 to the user terminal 20 (Step S79). The viewer software generates the DVD-Video files V0 including the downloaded music data sets as the background music (Step S80), and records the image data sets S2 and the generated DVD-Video files V0 in a DVD-R (Step S81) to end the procedure.

In the second embodiment, the music data sets may be selected and included in the title list L0 through consideration of the gender, the family composition, and the like of the user 2 included in the user information database.

In the case where photography has been carried out with a camera having a GPS function, the image data sets S2 are added with location information (information of the latitude and longitude) representing places where the image data sets S2 were obtained. For this reason, the music data sets may be searched for and included in the title list L0, based on the location information of the image data sets S2. For example, in the case where the location information corresponds to Hawaii, titles of the music data sets in the genre of Hawaiian music are included in the title list L0. In the case where the location information represents Tokyo Disney Land, titles of the music data sets of Disney films are included in the title list L0.

In this manner, the musical pieces corresponding to the location of the images in the slide shows can be included as the background music of the slide shows. Therefore, the user 2 can enjoy the slide shows in an atmosphere reflecting the location of the images.

In the second embodiment, the digitalization center 4 generates the image data sets S2 and the DVD-Video files V0, and records them in the DVD-R. However, the user 2 may obtain the image data sets from the recording media 10 by scanning the negative films NF and the prints P, for example. In this case, the user 2 then sends the image data sets to the digitalization center 4 where the DVD-Video files V0 are generated from the image data sets sent by the user 2 and recorded in the DVD-R.

In the case where the year ranges inferred from the photography date information D of the image data sets S2 are wide, the image data sets S2 often represent growth of a person. In the case where generation of the DVD-R is requested regarding images of a hobby of the user, words such as "car" representing the hobby are included in the comment in many cases. In the case of images of wedding and short trip, a large amount of images have been obtained in a comparatively short period, and characters such as "wedding" and "trip" are often included in the comment. For this reason, the comment and the ranges of the photography date of the images suggest a story of the slide shows to some degree.

Therefore, in the case where the story of the images to be included in the slide shows can be inferred to some degree from the comment and the ranges of photography date as has been described above, the music data sets are preferably selected in relation to the story. For example, in the case of images of growth record, the music data sets may be selected in accordance with the year ranges as in the embodiment described above. However, in the case of images of hobby, wedding, and trip, the music data sets whose titles include the characters representing the hobby, wedding, and trip are selected and included in the title list L0.

In the second embodiment, the musical piece storage unit 54 is installed in the digitalization center 4. However, the music data sets may be searched for and selected through access to the external music server storing the music data sets via the communication unit 53.

What is claimed is:

1. An apparatus comprising:
   at least one processor; and
   a memory storing instructions configured to instruct the at least one processor to automatically perform:
   selecting musical pieces that can be included in a slide show of images based on a story of the images inferred from photography dates of the images and at least one comment associated with the images, wherein the story is associated with a user;
   generating a list of at least some of the selected musical pieces, the selected musical pieces being selected from predetermined music data sets of musical pieces that were popular in a year range of the photography dates of the images and based on previously provided user information regarding the user, the user information including at least one of a gender of the user, a family composition of the user, and location information of the images;
   receiving at least one musical piece selection from the list; and
   generating the slide show image including the at least one musical piece selection.

2. A computer implemented method comprising:
   selecting, by a computer system, musical pieces that can be included in a slide show of images based on a story of the images inferred from photography dates of the images and at least one comment associated with the images, wherein the story is associated with a user;
   generating, by the computer system, a list of at least some of the selected musical pieces, the selected musical pieces being selected from predetermined music data sets of musical pieces that were popular in a year range of the photography dates of the images and based on previously provided user information regarding the user, the user information including at least one of a gender of the user, a family composition of the user, and location information of the images;
   receiving, by the computer system, at least one musical piece selection from the list; and
   generating, by the computer system, the slide show image including the at least one musical piece selection.

3. A non-transitory computer readable medium including a program for causing a computer to execute a method, the program comprising:
   automatically selecting musical pieces that can be included in a slide show of images based on a story of the images inferred from photography dates of the images and at least one comment associated with the images, wherein the story is associated with a user;
   automatically generating a list of the selected musical pieces, the selected musical pieces being selected from predetermined music data sets of musical pieces that were popular in a year range of the photography dates of the images and based on previously provided user information regarding the user, the user information including at least one of a gender of the user, a family composition of the user, and location information of the images;
   receiving at least one musical piece selection from the list; and
   automatically generating the slide show image including the at least one musical piece selection.

4. The apparatus of claim 1, wherein the location associated with at least one of the images is obtained from a GPS function.

5. The apparatus of claim 1, further comprising receiving the at least one comments from the user over the internet.

6. The apparatus of claim 1, wherein the story is associated with at least one of a hobby, wedding, and trip of the user.

7. The apparatus of claim 6, wherein the predetermined music data sets are selected based on titles associated with the predetermined music data sets that include characters representing the at least one of a hobby, wedding, and trip of the user.

8. The apparatus of claim 1, wherein the story is associated with a growth record.

9. The apparatus of claim 1, wherein the at least one musical piece selection is made by the user.

10. The method of claim 2, wherein the location associated with at least one of the images is obtained from a GPS function.

11. The method of claim 2, further comprising receiving the at least one comment from the user over the internet.

12. The method of claim 2, wherein the story is associated with at least one of a hobby, wedding, and trip of the user.

13. The method of claim 12, wherein the predetermined music data sets are selected based on titles associated with the predetermined music data sets that include characters representing the at least one of a hobby, wedding, and trip of the user.

14. The method of claim 2, wherein the story is associated with a growth record.

15. The method of claim 2, wherein the at least one musical piece selection is made by the user.

16. The non-transitory computer readable medium of claim 3, wherein the location associated with at least one of the images is obtained from a GPS function.

17. The non-transitory computer readable medium of claim 3, further comprising receiving the at least one comment from the user over the internet.

18. The non-transitory computer readable medium of claim 3, wherein the story is associated with at least one of a hobby, wedding, and trip of the user.

19. The non-transitory computer readable medium of claim 3, wherein the story is associated with a growth record.

20. The non-transitory computer readable medium of claim 3, wherein the at least one musical piece selection is made by the user.

\* \* \* \* \*